(12) United States Patent
Morikoshi

(10) Patent No.: US 10,798,889 B2
(45) Date of Patent: Oct. 13, 2020

(54) EMITTER AND DRIP IRRIGATION TUBE

(71) Applicant: Enplas Corporation, Saitama (JP)

(72) Inventor: Daisuke Morikoshi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 42 days.

(21) Appl. No.: 15/763,849

(22) PCT Filed: Sep. 16, 2016

(86) PCT No.: PCT/JP2016/077357
§ 371 (c)(1),
(2) Date: Mar. 28, 2018

(87) PCT Pub. No.: WO2017/057033
PCT Pub. Date: Apr. 6, 2017

(65) Prior Publication Data
US 2018/0271039 A1  Sep. 27, 2018

(30) Foreign Application Priority Data

Oct. 1, 2015  (JP) .................................. 2015-195668

(51) Int. Cl.
*A01G 25/02*  (2006.01)
(52) U.S. Cl.
CPC .......... *A01G 25/023* (2013.01); *Y02A 40/237* (2018.01)
(58) Field of Classification Search
CPC .... A01G 25/023; A01G 25/02; A01G 25/026; Y02A 40/237

(Continued)

(56) References Cited

U.S. PATENT DOCUMENTS 4,655,397 A * 4/1987 Gorney ............... A01G 25/023
239/542
5,207,386 A   5/1993 Mehoudar
(Continued)

FOREIGN PATENT DOCUMENTS

JP    05-276841 A    10/1993
JP    2001-519174 A  10/2001
WO    03/066228 A1   8/2003

OTHER PUBLICATIONS

International Search Report from International Application No. PCT/JP2016/077357 dated Dec. 20, 2016.
(Continued)

*Primary Examiner* — Qingzhang Zhou
(74) *Attorney, Agent, or Firm* — Brundidge & Stanger, P.C.

(57) ABSTRACT

An emitter having a water intake part, a discharge part, a channel, and a pressure reduction channel. The pressure reduction channel includes a groove and a plurality of projections. The plurality of projections include first and second projections that are adjacent to one another in the groove depth direction. The first projections are positioned on one side in the depth direction of the groove, and when seen from a planar view, the tip ends thereof project from the inside surface of the groove so as to cross the center line of the groove. The second projections are positioned on the other side in the depth direction of the groove, and when seen from a planar view, the tip ends thereof project from the inside surface of the groove so as not to cross the center line of the groove.

4 Claims, 10 Drawing Sheets

(58) Field of Classification Search
USPC .................................. 239/542, 547, 562, 566
See application file for complete search history.

(56) References Cited

U.S. PATENT DOCUMENTS

| | | | | |
|---|---|---|---|---|
| 5,944,260 | A * | 8/1999 | Wang .................. | A01G 25/023 239/542 |
| 6,250,571 | B1 * | 6/2001 | Cohen .................. | A01G 25/023 239/542 |
| 8,998,112 | B2 * | 4/2015 | Cohen .................. | A01G 25/023 239/542 |
| 2005/0258278 | A1 | 11/2005 | Cohen | |
| 2012/0199673 | A1 | 8/2012 | Cohen | |

OTHER PUBLICATIONS

Extended European Search Report for EP16851207.7 dated Apr. 15, 2019.

* cited by examiner

EMITTER AND DRIP IRRIGATION TUBE

TECHNICAL FIELD

The present invention relates to an emitter and a drip irrigation tube including the emitter.

BACKGROUND ART

Conventionally, a drip irrigation method is known as a method for culturing plants. In the drip irrigation method, a drip irrigation tube is disposed on the soil where plants are planted, and irrigation liquid such as water and liquid fertilizer is dropped from the drip irrigation tube to the soil. The drip irrigation method has been increasingly attracting attention in recent years since the method can minimize the consumption rate of the irrigation liquid.

Normally, the drip irrigation tube includes a tube provided with a plurality of through holes for discharging irrigation liquid, and a plurality of emitters (also called "drippers") for discharging irrigation liquid from respective through holes. In addition, emitters which are joined on the inner wall surface of the tube (see, for example, PTL 1), and emitters which are inserted to the tube from the exterior of the tube are known.

FIGS. 1A and 1B illustrate a configuration of emitter 1 disclosed in PTL 1 adapted to be joined on the inner wall surface of the tube. FIG. 1A is a perspective view illustrating a configuration of emitter 1, and FIG. 1B is a partially enlarged bottom view of channel 2 of emitter 1. Emitter 1 includes inlet 3 for intake of irrigation liquid and outlet 4 for discharging irrigation liquid. Channel 2 includes control path 5 disposed at a center of channel 2 and having width "a," and a plurality of protrusions 6 protruding from the both sides of the inner surface of channel 2 and alternately disposed in the longitudinal axial direction of control path 5. The end surfaces of protrusions 6 protruding from one side of the inner surface of channel 2 are located on a first virtual plane, and the end surfaces of protrusions 6 protruding from the other side of the inner surface of channel 2 are located on a second virtual plane that is parallel to the first virtual plane. The space between the first virtual plane and the second virtual plane corresponds to control path 5.

Emitter 1 disclosed in PTL 1 is used in the state where the surface on which channel 2 is formed is joined to the inner surface of the tube. A drip irrigation tube using emitter 1 disclosed in PTL 1 can supply irrigation liquid at a desired flow rate, and can reduce clogging with accumulated foreign matters such as sand grains and/or deposits in channel 2. PTL 1 discloses that one factor that reduces clogging is generation of a vortex between each protrusion 6.

CITATION LIST

Patent Literature

PTL 1
Japanese Patent Application Laid-Open No. 5-276841

SUMMARY OF INVENTION

Technical Problem

In the emitter disclosed in PTL 1, however, the vortex is generated in a plane approximately parallel to a plane including the flow direction and the width direction of the channel, and the liquid is agitated only two-dimensionally in the channel (see FIGS. 5C and 5D). Consequently, the clogging with accumulated foreign matters might not be sufficiently prevented.

In view of this, an object of the present invention is to provide an emitter and a drip irrigation tube that can more effectively suppress clogging with accumulated foreign matters in the channel, and thus can quantitatively discharge the irrigation liquid.

Solution to Problem

To solve the above-mentioned problems, an emitter according to embodiments of the present invention is configured to be joined on an inner wall surface of a tube for carrying irrigation liquid at a position corresponding to a discharging port that communicates between inside and outside of the tube, the emitter being configured to quantitatively discharge the irrigation liquid in the tube from the discharging port to the outside of the tube, the emitter including: an intake part for intake of the irrigation liquid; a discharging part configured to be disposed to face the discharging port, and configured to discharge the irrigation liquid; a channel configured to connect the intake part and the discharging part, and configured to distribute the irrigation liquid; and a pressure reducing channel disposed in the channel, and configured to reduce a pressure of the irrigation liquid taken from the intake part, wherein the pressure reducing channel includes: a groove including an opening configured to be closed by the inner wall surface of the tube, and a plurality of protrusions protruding from both sides of an inner surface of the groove, the plurality of protrusions being alternately arranged in a flow direction of the irrigation liquid in the pressure reducing channel, each of the plurality of protrusions includes a first protrusion and a second protrusion that are arranged next to each other in a depth direction of the groove, the first protrusion is disposed on one side in the protrusion in the depth direction of the groove, the first protrusion protrudes from the inner surface of the groove such that a tip end of the first protrusion crosses a center line of the groove in plan view, the second protrusion is disposed on another side in the protrusion in the depth direction of the groove, and the second protrusion protrudes from the inner surface of the groove such that a tip end of the second protrusion does not cross the center line of the groove in plan view.

In addition, to solve the above-mentioned problems, a drip irrigation tube according to embodiments of the present invention includes: a tube including a discharging port for discharging irrigation liquid; and the emitter according to claim 1 or 2 that is joined on an inner wall surface of the tube at a position corresponding to the discharging port.

Advantageous Effects of Invention

In the emitter and the drip irrigation tube of the embodiments of the present invention, a vortex of the irrigation liquid that moves also in the depth direction in the pressure reducing channel is generated, and it is thus possible to more effectively suppress clogging with accumulated foreign matters in the pressure reducing channel.

DESCRIPTION OF EMBODIMENTS

Embodiments of the present invention are elaborated below with reference to the accompanying drawings.

Embodiment 1

Configurations of Drip Irrigation Tube and Emitter

Figure 1A:
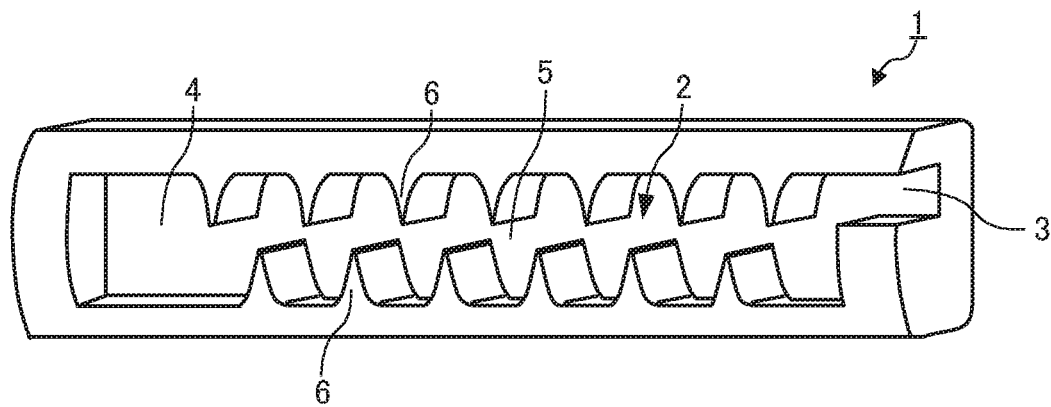
FIGS. 1A and 1B illustrate a configuration of an emitter disclosed in PTL 1.
Figure 1B:
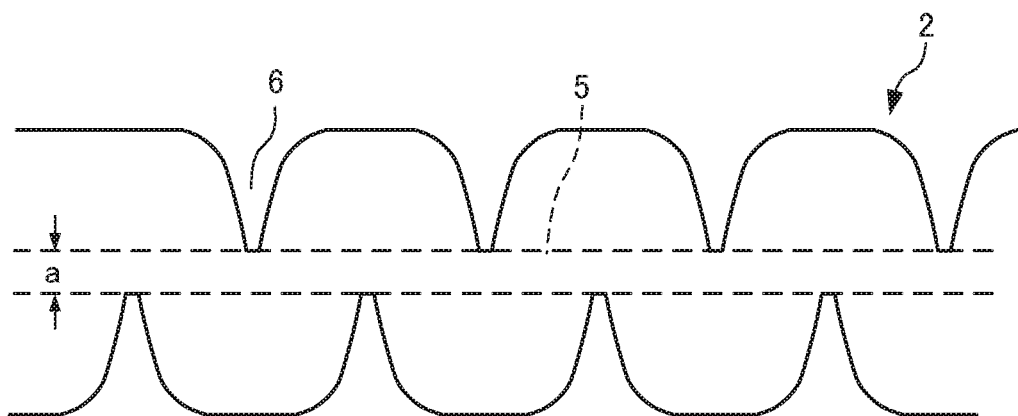
Figure 2:
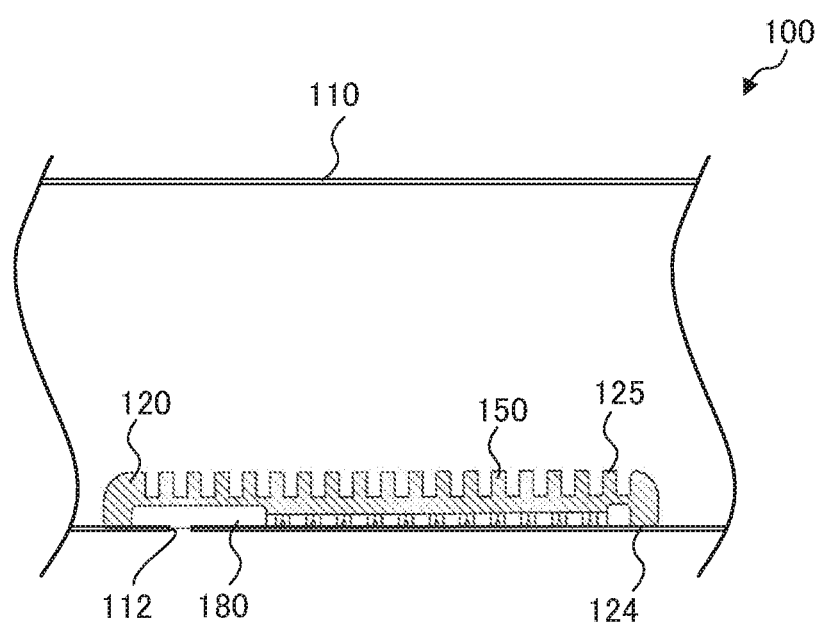
FIG. 2 is a sectional view of a drip irrigation tube according to Embodiment 1 of the present invention.

FIG. 2 is a sectional view along the axial direction of drip irrigation tube 100 according to Embodiment 1 of the present invention.

As illustrated in FIG. 2, drip irrigation tube 100 includes tube 110 and emitter 120.

Tube 110 is a pipe for carrying irrigation liquid. The material of tube 110 is not limited. In the present embodiment, the material of tube 110 is polyethylene. In the wall of tube 110, a plurality of discharging ports 112 for discharging irrigation liquid are formed at a predetermined interval (for example, 200 to 500 mm) in the axial direction of tube 110. The diameter of the opening of discharging port 112 is not limited as long as irrigation liquid can be discharged. In the present embodiment, the diameter of the opening of discharging port 112 is 1.5 mm Emitters 120 are joined at respective positions corresponding to discharging ports 112 on the inner wall surface of tube 110. The cross-sectional shape and the cross-sectional area of tube 110 in the direction perpendicular to the axial direction of tube 110 are not limited as long as emitter 120 can be disposed inside tube 110.

Drip irrigation tube 100 is assembled by joining rear surface 124 of emitter 120 to the inner wall surface of tube 110. The method of joining tube 110 and emitter 120 is not limited. Examples of the method of joining tube 110 and emitter 120 include welding of the resin material of tube 110 or emitter 120, bonding with an adhesive agent and the like. Normally, discharging port 112 is formed after tube 110 and emitter 120 are joined, while discharging port 112 may be formed before tube 110 and emitter 120 are joined.

Figure 3A:
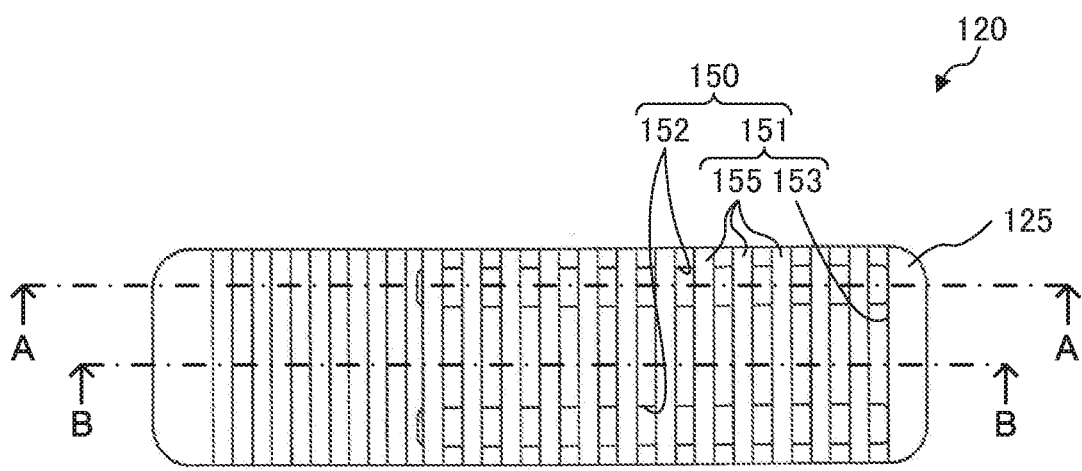
FIGS. 3A to 3C illustrate a configuration of an emitter according to Embodiment 1 of the present invention.
Figure 3B:
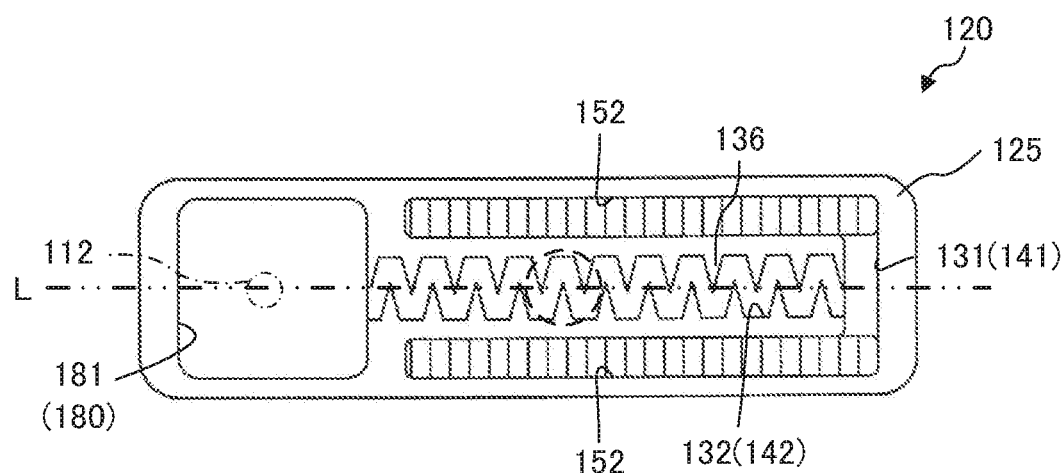
Figure 3C:
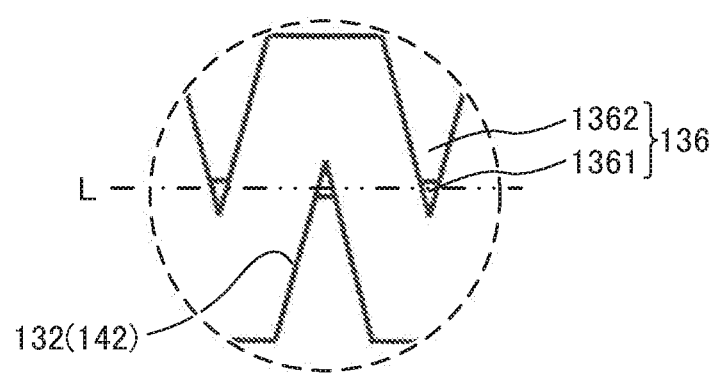
Figure 4A:
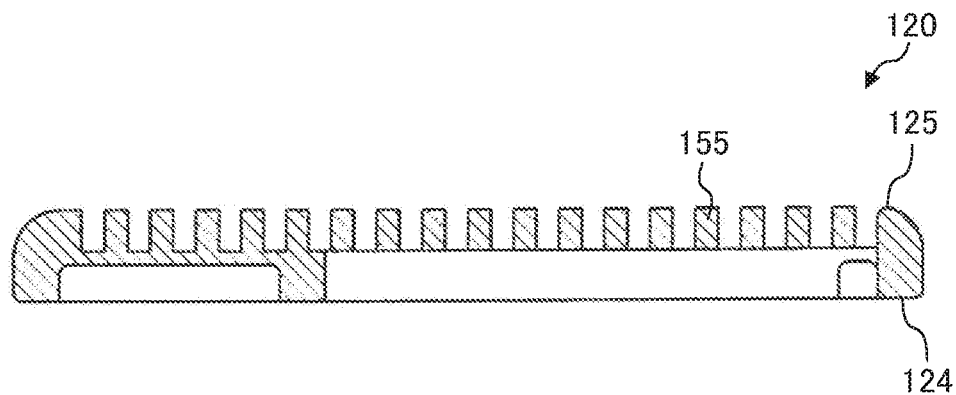
FIGS. 4A to 4C illustrate a configuration of the emitter according to Embodiment 1 of the present invention.
Figure 4B:
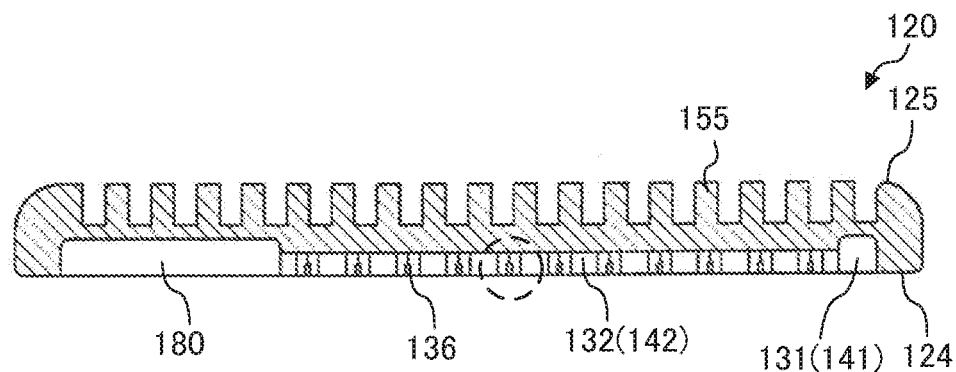
Figure 4C:
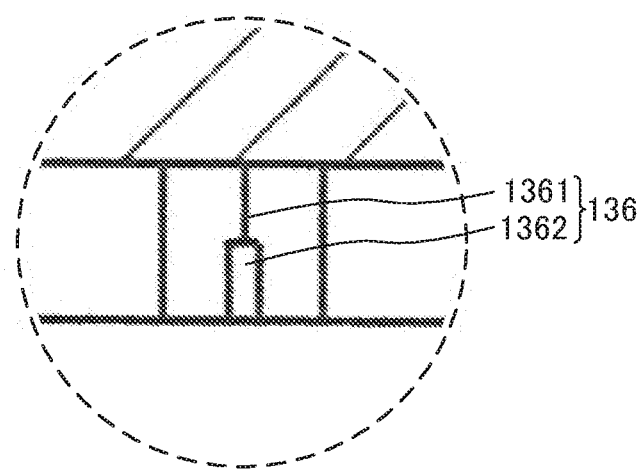

FIG. 3A is a plan view of emitter 120, FIG. 3B is a bottom view of emitter 120, and FIG. 3C is a partially enlarged bottom view of the region indicated with the broken line in FIG. 3B. FIG. 4A is a sectional view taken along line A-A of FIG. 3A, FIG. 4B is a sectional view taken along line B-B of FIG. 3A, and FIG. 4C is a partially enlarged sectional view of the region indicated with the broken line in FIG. 4B.

As illustrated in FIG. 2, emitter 120 is joined on the inner wall surface of tube 110 to cover discharging port 112. The shape of emitter 120 is not limited as long as emitter 120 can make intimate contact with the inner wall surface of tube 110 and can cover discharging port 112. In the present embodiment, in the cross-section of emitter 120 in the direction perpendicular to the axial direction of tube 110, the shape of rear surface 124 that is joined to the inner wall surface of tube 110 is a substantially arc shape that protrudes toward the inner wall surface of tube 110 along the inner wall surface of tube 110. In plan view, emitter 120 has a substantially rectangular shape with chamfered four corners. The size of emitter 120 is not limited. In the present embodiment, emitter 120 has a long side length of 25 mm, a short side length of 8 mm, and a height of 2.5 mm.

Emitter 120 may be molded with a material having flexibility, or a material that does not have flexibility. Examples of the material of emitter 120 include resin and rubber. Examples of the resin include polyethylene and silicone. The flexibility of emitter 120 can be adjusted by use of an elastic resin material. Examples of the method of adjusting the flexibility of emitter 120 include selection of elastic resins, adjustment of the mixing ratio of an elastic resin material to a hard resin material, and the like. The molded article of emitter 120 can be manufactured by injection molding, for example.

Emitter 120 includes intake part 150, connecting groove 131 that serves as connecting channel 141, pressure reducing groove 132 that serves as pressure reducing channel 142, and discharging part 180. Intake part 150 is disposed on front surface 125 side of emitter 120. In addition, connecting groove 131, pressure reducing groove 132 and discharging part 180 are disposed on rear surface 124 side of emitter 120.

When emitter 120 and tube 110 are joined, connecting groove 131 and pressure reducing groove 132 serve as connecting channel 141 and pressure reducing channel 142, respectively. With this configuration, a channel, which is composed of intake part 150, connecting channel 141, pressure reducing channel 142 and discharging part 180, and connects intake part 150 and discharging part 180, is formed. The channel distributes irrigation liquid from intake part 150 to discharging part 180.

Intake part 150 is disposed on front surface 125 side of emitter 120 along the longitudinal axial direction. In the present embodiment, two separate intake parts 150 are disposed at outer edges on both sides (see FIG. 3A). Each intake part 150 includes intake side screen part 151 and a plurality of intake through holes 152.

Intake side screen part 151 prevents entry, into intake recess 153, of floating matters in the irrigation liquid to be taken into emitter 120. Intake side screen part 151 opens to the inside of tube 110, and includes intake recess 153 and a plurality of projection lines 155.

Intake recess 153 is a recess formed on front surface 125 side of emitter 120. The depth of intake recess 153 is not limited, and is appropriately set in accordance with the size of emitter 120. Projection lines 155 are formed on the bottom surface of intake recess 153. In addition, intake through hole 152 is formed in the bottom surface of intake recess 153.

Projection lines 155 are disposed on the bottom surface of intake recess 153. The placement and the number of projection lines 155 are not limited as long as intake part 150 can prevent entry of floating matters of irrigation liquid while allowing entry of the irrigation liquid from the opening side of intake recess 153. In the present embodiment, projection lines 155 are arranged such that the longitudinal axial direction of projection lines 155 matches the minor axial direction of emitter 120. The distance between projection lines 155 adjacent to each other is not limited as long as the above-described function can be ensured.

Intake through hole 152 is formed in the bottom surface of intake recess 153. The shape and the number of intake through hole 152 are is not limited as long as the irrigation liquid taken into intake recess 153 can be taken into emitter 120. In the present embodiment, intake through hole 152 is two long holes formed at the outer edges on the both sides along the longitudinal axial direction of emitter 120 in the bottom surface of intake recess 153. Each long hole is partially covered by projection lines 155, and therefore intake through hole 152 appears to be divided into a plurality of through holes when viewed from front surface 125 side (see FIG. 3A).

The irrigation liquid that has passed through the inside of tube 110 is taken into emitter 120 while the floating matters in the irrigation liquid are prevented from entering into intake recess 153 by intake side screen part 151.

Connecting groove 131 (connecting channel 141) connects intake through hole 152 (intake part 150) and pressure reducing groove 132. Connecting groove 131 is formed in a linear shape along the minor axial direction of emitter 120 on rear surface 124 side of emitter 120. Pressure reducing groove 132 is connected with a portion in the proximity of a center portion of connecting groove 131. When tube 110 and emitter 120 are joined, connecting groove 131 and the inner wall surface of tube 110 form connecting channel 141. The irrigation liquid taken from intake part 150 flows toward pressure reducing channel 142 through connecting channel 141.

Pressure reducing groove 132 (pressure reducing channel 142) is disposed in the channel, and connects connecting groove 131 (connecting channel 141) and discharging part 180. Pressure reducing groove 132 (pressure reducing channel 142) reduces the pressure of the irrigation liquid taken from intake part 150, and guides the liquid to discharging part 180. Pressure reducing groove 132 is disposed at a center portion of rear surface 124 along the longitudinal axial direction. The upstream end of pressure reducing groove 132 is connected with connecting groove 131, and the downstream end of pressure reducing groove 132 is connected with discharging part 180. In plan view, pressure reducing groove 132 has a zigzag shape.

In pressure reducing groove 132, a plurality of protrusions 136 protrude from the inner surfaces on the both sides in an alternate manner in the flow direction of the irrigation liquid in pressure reducing channel 142. The shape of protrusion 136 is not limited, and preferably, protrusion 136 has a substantially triangular prism shape. Protrusion 136 includes first protrusion 1361 and second protrusion 1362 that are adjacent to each other in the depth direction of pressure reducing groove 132. First protrusion 1361 is disposed on one side in the depth direction of pressure reducing groove 132, and second protrusion 1362 is disposed on the other side in the depth direction of pressure reducing groove 132. In the present embodiment, as illustrated in FIGS. 3C and 4C, first protrusion 1361 is disposed on the bottom side of pressure reducing groove 132, and second protrusion 1362 is disposed on the opening (rear surface 124) side of pressure reducing groove 132. In addition, in plan view, first protrusion 1361 extends from the inner surface of pressure reducing groove 132 such that the tip end of first protrusion 1361 crosses center line L of pressure reducing groove 132. On the other hand, in plan view, second protrusion 1362 extends from the inner surface of pressure reducing groove 132 such that the tip end of second protrusion 1362 does not cross center line L of pressure reducing groove 132 (see FIG. 3C).

When tube 110 and emitter 120 are joined, the opening of pressure reducing groove 133 is closed by the inner wall surface of tube 110, and pressure reducing channel 142 is formed. The pressure of the irrigation liquid taken from intake part 150 is reduced by pressure reducing channel 142, and the liquid is guided to discharging part 180. As elaborated later, pressure reducing channel 142 can suppress accumulation of foreign matters in pressure reducing channel 142.

Discharging part 180 is disposed on rear surface 124 side of emitter 120. Discharging part 180 sends, to discharging port 112 of tube 110, the irrigation liquid coming from pressure reducing channel 142. The configuration of discharging part 180 is not limited as long as the above-described function can be ensured. In the present embodiment, discharging part 180 has discharging recess 181.

Discharging recess 181 is disposed on rear surface 124 side of emitter 120. The shape of discharging recess 181 in plan view is not limited, and is a substantially rectangular shape, for example.

Operations of Drip Irrigation Tube and Emitter

Next, an operation of drip irrigation tube 100 is described. First, irrigation liquid is fed into tube 110. Examples of the irrigation liquid include water, liquid fertilizer, agricultural chemicals and mixtures thereof. Preferably, the pressure of the irrigation liquid that is fed to drip irrigation tube 100 is 0.1 MPa or lower in view of simply implementing the drip irrigation method, or preventing damaging of tube 110 and emitter 120. The irrigation liquid in tube 110 is taken into emitter 120 from intake part 150. To be more specific, the irrigation liquid in tube 110 enters intake recess 153 from gaps between projection lines 155, and passes through intake through hole 152. At this time, floating matters in the irrigation liquid can be removed since intake part 150 includes intake side screen part 151 (the gaps between projection lines 155).

The irrigation liquid taken from intake part 131 reaches connecting channel 141. The irrigation liquid having reached connecting channel 141 flows into pressure reducing channel 142.

The irrigation liquid having entered pressure reducing channel 142 flows into discharging part 180 while the pressure thereof is reduced. As elaborated later, a three-dimensionally swirling vortex is generated in pressure reducing channel 142. The irrigation liquid having entered discharging part 180 is discharged out of tube 110 from discharging port 112 of tube 110.

Simulation

As described above, in emitter 120 according to the present embodiment, protrusion 136 includes first protrusion 1361 and second protrusion 1362 continuously connected to each other in the depth direction of pressure reducing groove 132. In view of this, a simulation was conducted to examine an influence of first protrusion 1361 and second protrusion 1362 on the irrigation liquid flowing through pressure reducing channel 142. In addition, for comparison, a simulation was conducted with an emitter (hereinafter referred to also as "emitter for comparison") including only protrusion 136' that has no first protrusion 1361, that is, a protrusion that protrudes from the inner surface of pressure reducing groove 132 such that the tip end thereof does not cross center line L of pressure reducing groove 132 in its entirety in the depth direction of pressure reducing groove 132.

Figure 5C:
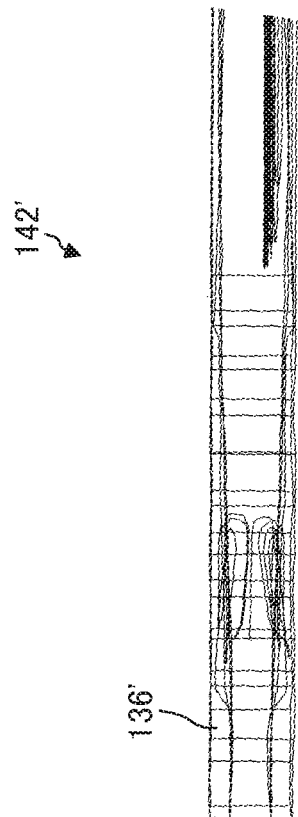
FIGS. 5A to 5D illustrate a simulation result of an emitter for comparison.
Figure 5D:
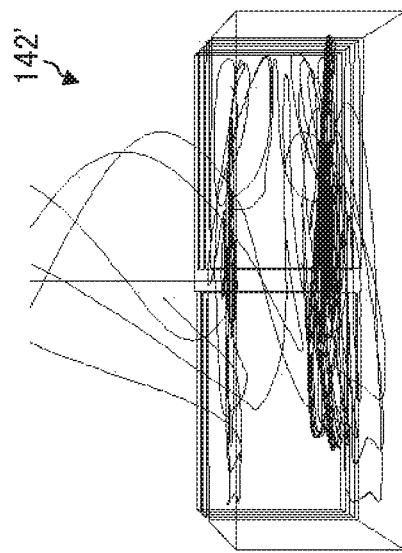
Figure 5A:
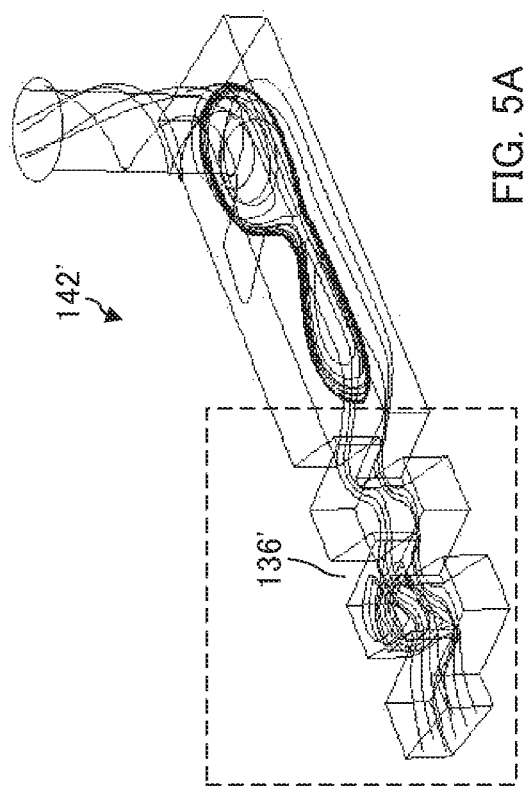
Figure 5B:
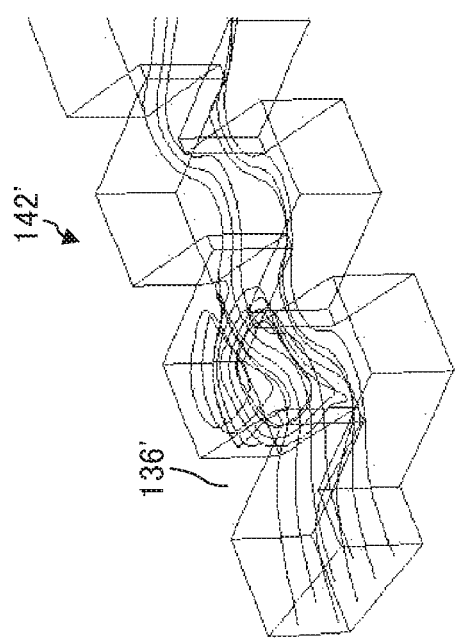
Figure 6A:
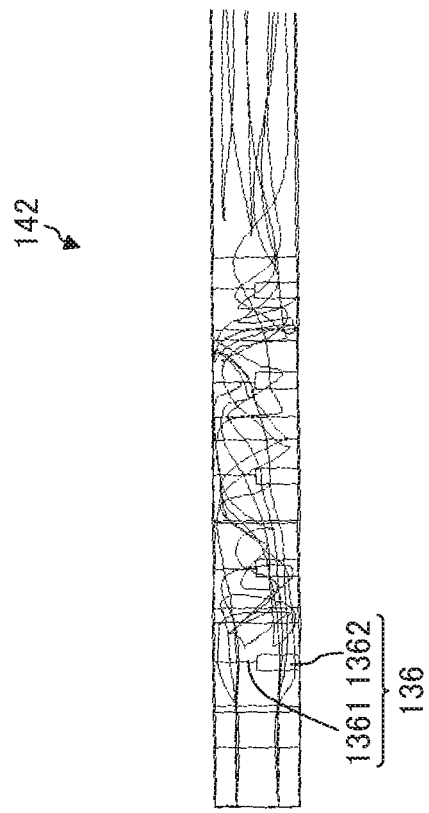
FIGS. 6A to 6D illustrate a simulation result of the emitter according to Embodiment 1 of the present invention.
Figure 6B:
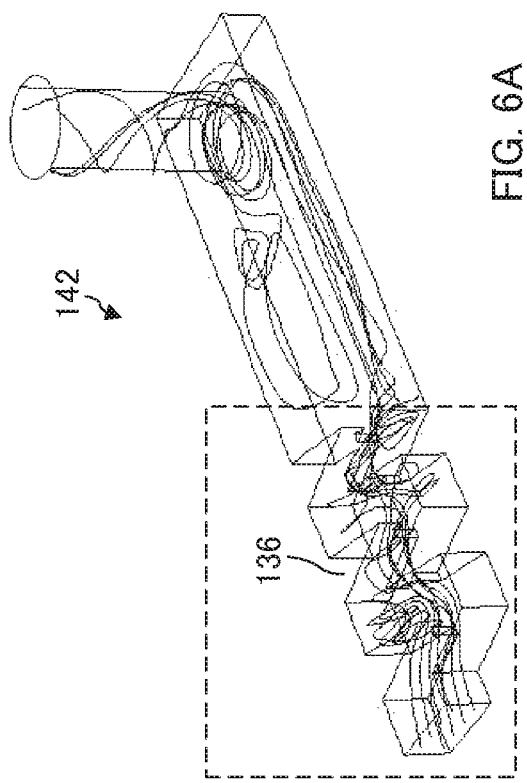
Figure 6C:
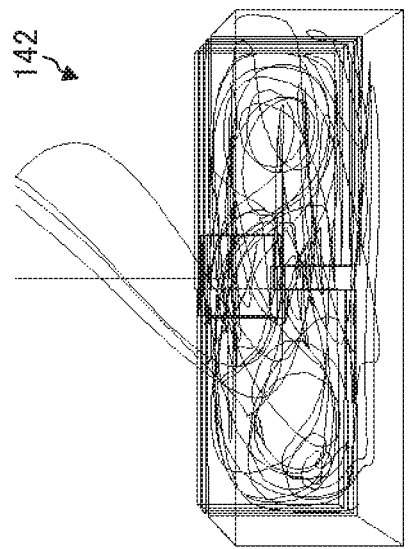
Figure 6D:
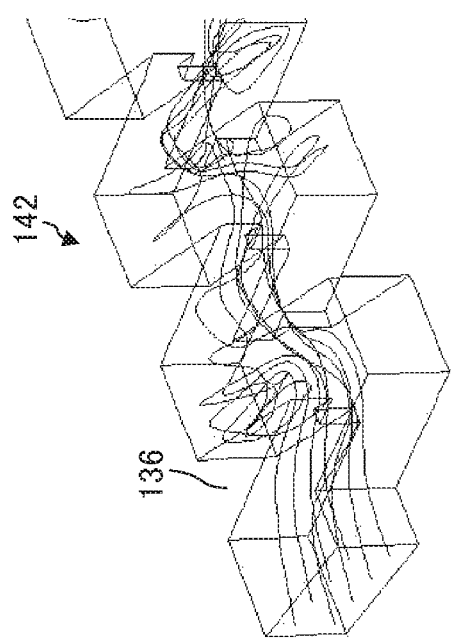

FIGS. 5A to 5D illustrate a simulation result of the emitter for comparison. FIG. 5A is a perspective view illustrating pressure reducing channel 142' and a flow of irrigation liquid therein, FIG. 5B is an enlarged perspective view of the region indicated with the broken line in FIG. 5A, FIG. 5C is a side perspective view illustrating pressure reducing channel 142' and a flow of irrigation liquid therein, and FIG. 5D is a front perspective view illustrating pressure reducing channel 142' and a flow of irrigation liquid therein as viewed from the upstream side. FIGS. 6A to 6D illustrate a simulation result of emitter 120 according to the present embodiment. FIG. 6A is a perspective view illustrating pressure reducing channel 142 and a flow of irrigation liquid therein, FIG. 6B is an enlarged perspective view of the region indicated with the broken line in FIG. 6A, FIG. 6C is a side perspective view illustrating pressure reducing channel 142 and a flow of irrigation liquid therein, and FIG. 6D is a front perspective view illustrating pressure reducing channel 142 and a flow of irrigation liquid therein as viewed from the upstream side. It is to be noted that the irrigation liquid flows from the left side to the right side in FIGS. 5A to 5C and FIGS. 6A to 6C, and the near side to the depth side in FIGS. 5D and 6D.

As can be seen in FIGS. 5A and 5B, in the emitter for comparison, a large part of the irrigation liquid having entered pressure reducing channel 142' flows through a portion in the proximity of the center line of the pressure reducing groove in a zigzag manner. Also, a part of the irrigation liquid having entered pressure reducing channel 142' swirls in the space between protrusions 136' adjacent to each other in the flow direction. In addition, as can be seen in FIGS. 5C and 5D, in pressure reducing channel 142', the irrigation liquid flows in a plane that is approximately parallel to a plane that includes the flow direction and the width direction of pressure reducing channel 142'. That is, in the emitter for comparison, the irrigation liquid two-dimensionally flows in pressure reducing channel 142'. In addition, as described above, a part of the irrigation liquid having entered pressure reducing channel 142' swirls in the space between protrusions 136' adjacent to each other in the flow direction, and agitates the irrigation liquid in pressure reducing channel 142'. With this configuration, even when foreign matters have entered the emitter, the emitter for comparison can, to a certain degree, suppress accumulation of the foreign matters in the space between protrusions 136' adjacent to each other in the flow direction. However, the emitter for comparison can only two-dimensionally agitate the irrigation liquid in the space between protrusions 136' adjacent to each other in the flow direction, and consequently accumulation of the foreign matters might not be sufficiently suppressed.

In contrast, emitter 120 according to the present embodiment can more effectively agitate the irrigation liquid in the space between protrusions 136 adjacent to each other in the flow direction. As can be seen in FIGS. 6A and 6B, also in emitter 120 according to the present embodiment, a large part of the irrigation liquid having entered pressure reducing channel 142 flows through a portion in the proximity of the center line of pressure reducing groove 132 in a zigzag manner. On the other hand, a part of the irrigation liquid having entered pressure reducing channel 142 swirls also in the depth direction in the space between protrusions 136 adjacent to each other in the flow direction. As can be seen in FIGS. 6C and 6D, in emitter 120 according to the present embodiment, the irrigation liquid moves also in the depth direction of pressure reducing groove 132 (pressure reducing channel 142). One reason for this is that protrusion 136 of emitter 120 includes first protrusion 1361 that protrudes such that the tip end thereof crosses center line L of pressure reducing groove 132, and second protrusion 1362 that protrudes such that the tip end thereof does not cross center line L of pressure reducing groove 132. To be more specific, since protrusion 136 includes first protrusion 1361 and second protrusion 1362 that are different in their lengths in the protruding direction, a part of the irrigation liquid flows in such a manner as to avoid first protrusion 1361, and thus the flow in the depth direction of pressure reducing groove 132 is generated. In this manner, the flow direction of the irrigation liquid is changed by first protrusion 1361, and the irrigation liquid three-dimensionally swirls in the space between protrusions 136 adjacent to each other in the flow direction. Accordingly, the irrigation liquid is three-dimensionally agitated in the space between protrusions 136 adjacent to each other in the flow direction in pressure reducing channel 142, and accumulation of foreign matters is more effectively suppressed in comparison with the emitter for comparison. Here, while first protrusion 1361 changes the flow direction of the irrigation liquid, the flow of the irrigation liquid is not largely hindered, and therefore the influence on the flow rate of the irrigation liquid flowing through pressure reducing channel 142 causes no problem. In addition, while the above-mentioned emitter for comparison includes protrusion 136' provided with no first protrusion 1361, an emitter that includes a protrusion provided with only first protrusion 1361 also cannot generate a flow in the depth direction of pressure reducing groove 132, and consequently might not sufficiently suppress the accumulation of the foreign matters in the space between the protrusions adjacent to each other in the flow direction.

Effect

As described above, in emitter 120 according to the present embodiment, protrusion 136 includes first protrusion 1361 that protrudes such that the tip end thereof cross center line L of pressure reducing groove 132, and second protrusion 1362 that protrudes such that the tip end thereof does not cross center line L of pressure reducing groove 132. With this configuration, a vortex of irrigation liquid that moves also in the depth direction of pressure reducing groove 132 can be generated. As a result, in comparison with the case where no first protrusion 1361 is provided and the case where only first protrusion 1361 is provided, emitter 120 according to the present embodiment can further enhance the effect of agitating the irrigation liquid in pressure reducing channel 142. Accordingly, emitter 120 according to the present embodiment can quantitatively drop the irrigation liquid while suppressing the clogging in pressure reducing channel 142.

Embodiment 2

A drip irrigation tube according to Embodiment 2 is different from drip irrigation tube 100 according to Embodiment 1 in configuration of emitter 220. Therefore, emitter 220 is described below, and the description of tube 110 is omitted.

Configuration of Emitter

Figure 7:
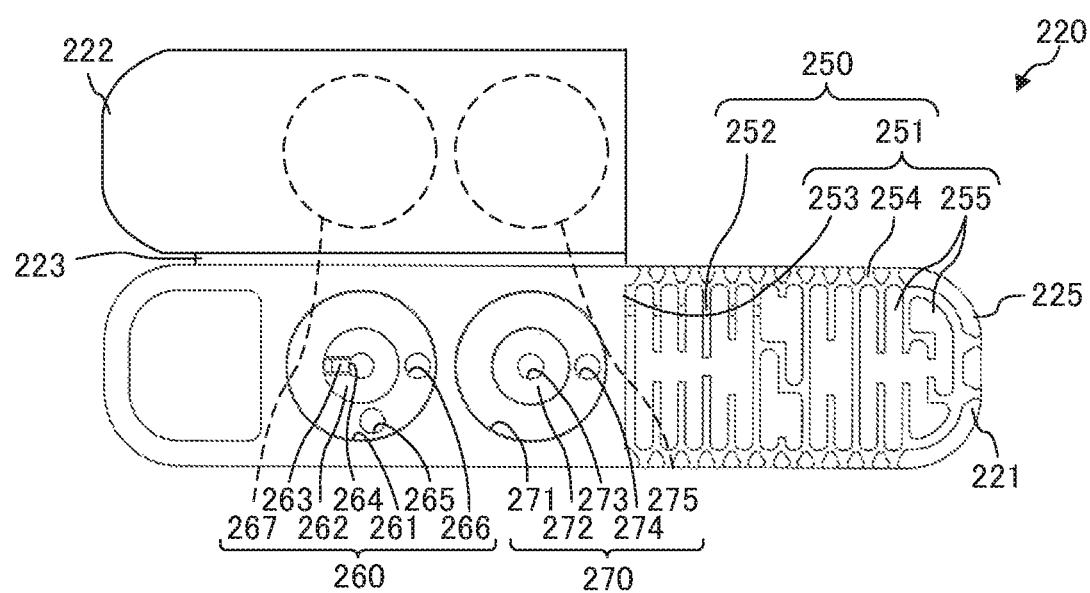
FIG. 7 illustrates a configuration of an emitter according to Embodiment 2 of the present invention.
Figure 8A:
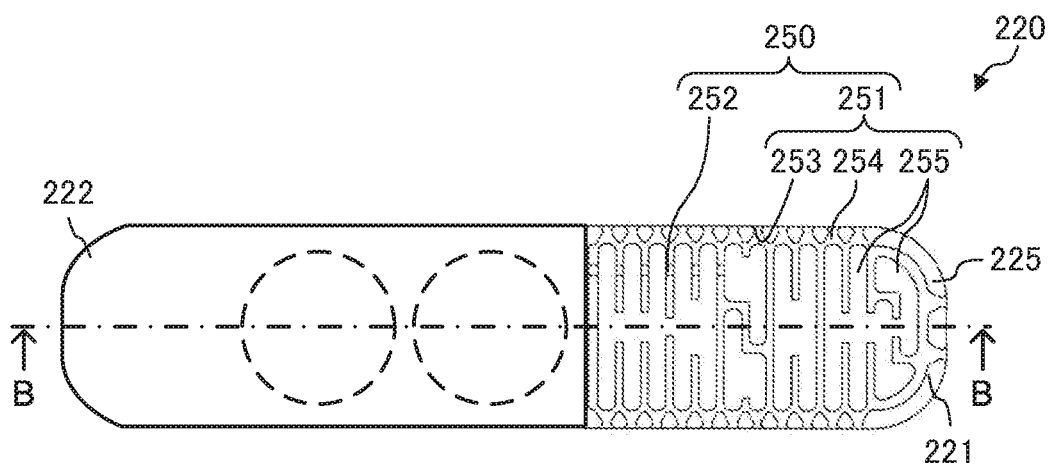
FIGS. 8A to 8C illustrate a configuration of the emitter according to Embodiment 2 of the present invention.
Figure 8B:
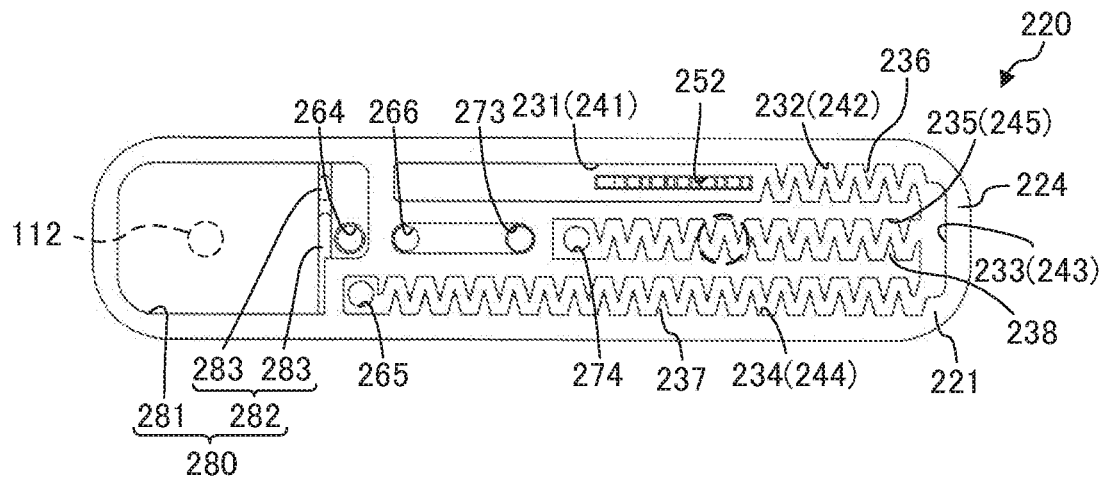
Figure 8C:
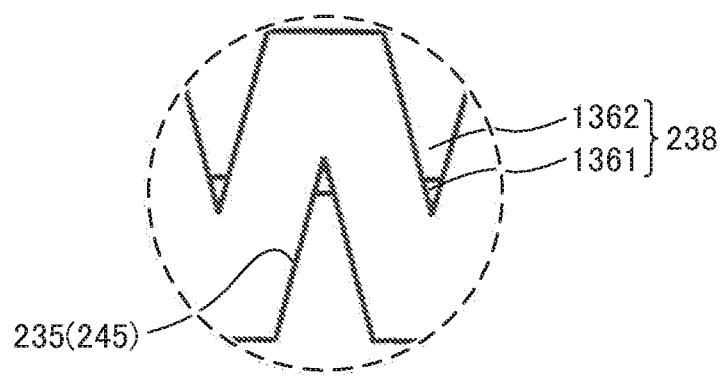
Figure 9A:
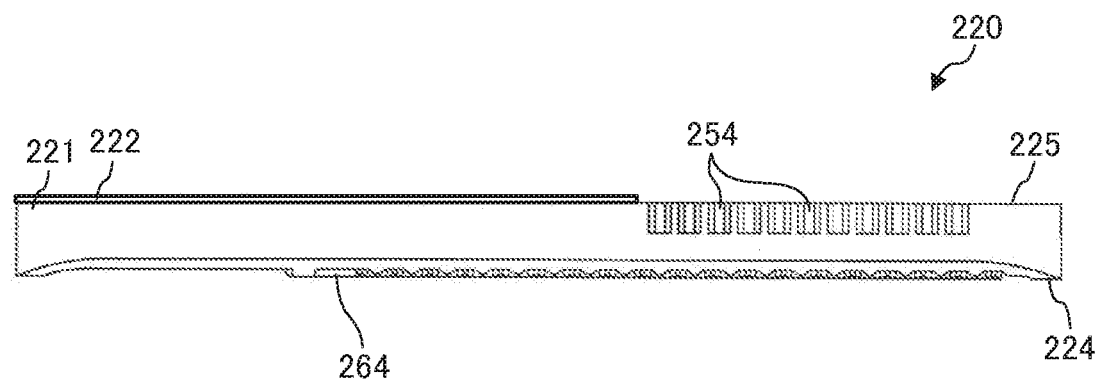
FIGS. 9A to 9C illustrate a configuration of the emitter according to Embodiment 2 of the present invention.
Figure 9B:
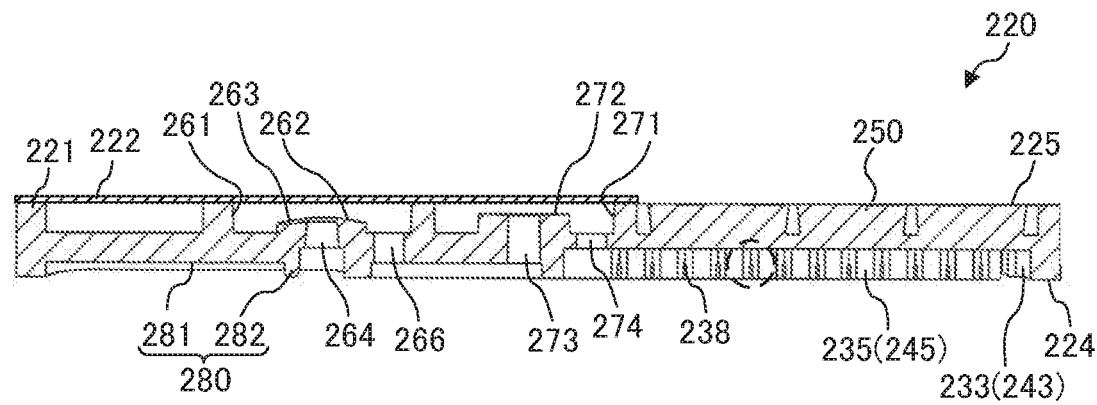
Figure 9C:
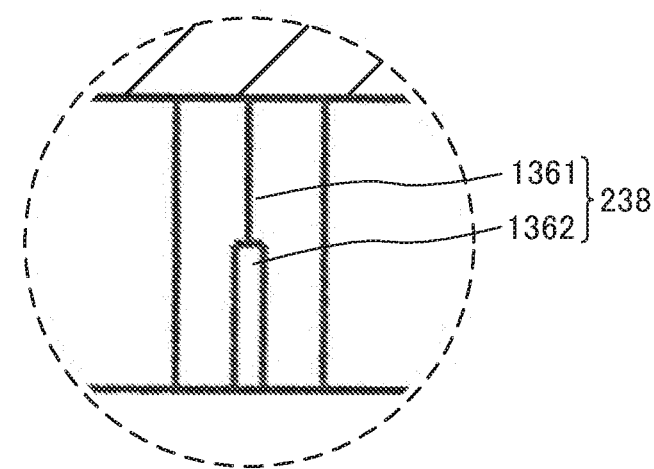

FIG. 7 is a plan view of emitter 220 before emitter main body 221 and film 222 are joined. FIG. 8A is a plan view of emitter 220 after emitter main body 221 and film 222 are joined, FIG. 8B is a bottom view of emitter 220 after emitter main body 221 and film 222 are joined, and FIG. 8C is a partially enlarged bottom view of the region indicated with the broken line in FIG. 8B. FIG. 9A is a side view of emitter 220, FIG. 9B is a sectional view taken along line B-B of FIG. 8A, and FIG. 9C is a partially enlarged sectional view of the region indicated with the broken line in FIG. 9B.

As illustrated in FIG. 7, emitter 220 includes emitter main body 221 that is joined to the inner wall surface of tube 110, and film 222 that is joined to emitter main body 221. Emitter main body 221 and film 222 may be integrally formed, or may be formed as separate members. In the present embodiment, emitter main body 221 and film 222 are integrally formed with hinge part 223 therebetween.

Preferably, emitter main body 221 and film 222 are formed with one material having flexibility. However, in the case where emitter main body 221 and film 222 are formed as separate members, emitter main body 221 may be formed with a material that does not have flexibility. Also, preferably, the diaphragm part (first diaphragm part 267 and second diaphragm part 275) described later is integrally formed as a part of emitter 220. In the present embodiment, emitter main body 221 and film 222 including the diaphragm part are integrally formed with one material having flexibility. Examples of the material of emitter main body 221 and film 222 include resin and rubber. Examples of the resin include polyethylene and silicone. The flexibility of emitter main body 221 and film 222 can be adjusted by use of an elastic resin material. Examples of the method of adjusting the flexibility of emitter main body 221 and film 222 include selection of elastic resins, adjustment of the mixing ratio of an elastic resin material to a hard resin material, and the like. An integral molded article of emitter main body 221 and film 222 can be manufactured by injection molding, for example.

Emitter 220 according to the present embodiment includes intake part 250, first connecting groove 231 that serves as first connecting channel 241, first pressure reducing groove 232 that serves as first pressure reducing channel 242, second connecting groove 233 that serves as second connecting channel 243, second pressure reducing groove 234 that serves as second pressure reducing channel 244, third pressure reducing groove 235 that serves as third pressure reducing channel 245, flow rate reducing part 260, channel opening-closing part 270, and discharging part 280. Intake part 250, flow rate reducing part 260 and channel opening-closing part 270 are disposed on front surface 225 side of emitter 220. In addition, first connecting groove 231, first pressure reducing groove 232, second connecting groove 233, second pressure reducing groove 234, third pressure reducing groove 235 and discharging part 280 are disposed on rear surface 224 side of emitter 220.

When emitter 220 and tube 110 are joined, first connecting groove 231, first pressure reducing groove 232, second connecting groove 233, second pressure reducing groove 234 and third pressure reducing groove 235 serve as first connecting channel 241, first pressure reducing channel 242, second connecting channel 243, second pressure reducing channel 244 and third pressure reducing channel 245, respectively. With this configuration, a first channel, which is composed of intake part 250, first connecting channel 241, first pressure reducing channel 242, second connecting channel 243, second pressure reducing channel 244, flow rate reducing part 260 and discharging part 280 and is configured to connect intake part 250 and discharging part 280, is formed. In addition, a second channel, which is composed of intake part 250, first connecting channel 241, first pressure reducing channel 242, second connecting channel 243, third pressure reducing channel 245, channel opening-closing part 270, channel reducing part 260 and discharging part 280 and is configured to connect intake part 250 and discharging part 280, is formed. Each of the first channel and the second channel distributes irrigation liquid from intake part 250 to discharging part 280. In the present embodiment, the first channel and the second channel overlap in the region between intake part 250 and second connecting channel 243. In addition, the downstream side of channel opening-closing part 270 in the second channel is connected with flow rate reducing part 260, and the first channel and the second channel overlap also in the region between flow rate reducing part 260 and discharging part 280.

Intake part 250 is disposed in approximately one-half of front surface 225 of emitter 220 (see FIGS. 7 and 8A). In the region where intake part 250 is not disposed in front surface 225, flow rate reducing part 260 and channel opening-closing part 270 (film 222) are disposed. Intake part 250 includes intake side screen part 251 and intake through hole 252.

Intake side screen part 251 prevents entry, into intake recess 253, of the floating matters in the irrigation liquid to be taken into emitter 220. Intake side screen part 251 opens to the inside of tube 110, and includes intake recess 253, a plurality of slits 254 and a plurality of projection lines 255.

Intake recess 253 is one recess entirely formed in the region where film 222 is not joined in front surface 225 of emitter 220. The depth of intake recess 253 is not limited, and is appropriately set in accordance with the size of emitter 220. Slits 254 are formed in the outer periphery wall of intake recess 253, and projection lines 255 are formed on the bottom surface of intake recess 253. In addition, intake through hole 252 is formed in the bottom surface of intake recess 253.

Slits 254 connect the inner surface of intake recess 253 and the outer surface of emitter main body 221, and prevent entry, into intake recess 253, of the floating matters in the irrigation liquid while allowing the irrigation liquid to enter intake recess 253 from the side surface of emitter main body 221. The shape of slit 254 is not limited as long as the above-described function can be ensured. In the present embodiment, slit 254 is formed in a shape whose width increases from the outer surface of emitter main body 221 toward the inner surface of intake recess 253 (see FIGS. 7 and 8A). Thus, slit 254 has a so-called wedge wire structure, and therefore the pressure drop of the irrigation liquid having entered intake recess 253 is suppressed.

Projection lines 255 are disposed on the bottom surface of intake recess 253. The placement and the number of projection lines 255 are not limited as long as intake part 250 can prevent entry of the floating matters of the irrigation liquid while taking the irrigation liquid from the opening side of intake recess 253. In the present embodiment, projection lines 255 are arranged such that the longitudinal axial direction of projection lines 255 matches the minor axial direction of emitter 220. In addition, each projection line 255 is formed such that the width thereof decreases from front surface 225 of emitter main body 221 toward the bottom surface of intake recess 253 (see FIG. 9B). That is, in the arrangement direction of projection lines 255, the space between projection lines 255 adjacent to each other has a so-called wedge wire structure. In addition, the distance between projection lines 255 adjacent to each other is not limited as long as the above-described function can be ensured. Since the space between projection lines 255 adjacent to each other has a so-called wedge wire structure as described above, the pressure drop of the irrigation liquid having entered intake recess 253 is suppressed.

Intake through hole 252 is formed in the bottom surface of intake recess 253. The shape and the number of intake through hole 252 are not limited as long as the irrigation liquid taken into intake recess 253 can be taken into emitter main body 221. In the present embodiment, intake through hole 252 is one long hole formed along the longitudinal axial direction of emitter 220 in the bottom surface of intake recess 253. This long hole is partially covered with projection lines 255, and therefore, intake through hole 252 appears to be divided into a plurality of through holes when viewed from front surface 225 side.

The irrigation liquid that has passed through the inside of tube 110 is taken into emitter main body 221 while the floating matters therein are prevented from entering intake recess 253 by intake side screen part 251.

First connecting groove 231 (first connecting channel 241) connects intake through hole 252 (intake part 250) and first pressure reducing groove 232. First connecting groove 231 is formed in a linear shape along the longitudinal axial direction of emitter 220 at the outer edge of rear surface 224. When tube 110 and emitter 220 are joined, first connecting groove 231 and the inner wall surface of tube 110 form first connecting channel 241. The irrigation liquid taken from intake part 250 flows to first pressure reducing channel 242 through first connecting channel 241.

First pressure reducing groove 232 (first pressure reducing channel 242) is disposed in the first channel and the second channel on the upstream side of flow rate reducing part 260, and connects first connecting groove 231 (first connecting channel 241) and second connecting groove 233 (second connecting channel 243). First pressure reducing groove 232 (first pressure reducing channel 242) reduces the pressure of the irrigation liquid taken from intake part 250, and guides the liquid to second connecting groove 233 (second connecting channel 243). First pressure reducing groove 232 is disposed in a linear shape along the longitudinal axial direction of emitter 220 at the outer edge of rear surface 224. The upstream end of first pressure reducing groove 232 is connected with first connecting groove 231, and the downstream end of first pressure reducing groove 232 is connected with the upstream end of second connecting groove 233. In plan view, first pressure reducing groove 232 has a zigzag shape. In first pressure reducing groove 232, third protrusions 236 each of which has a substantially triangular prism shape and protrudes from the inner surface first pressure reducing groove 232, are alternately disposed along the flow direction of the irrigation liquid. In the present embodiment, each third protrusion 236 includes first protrusion 1361 disposed on the bottom side of first pressure reducing groove 232, and second protrusion 1362 disposed on the opening (rear surface 224) side of first pressure reducing groove 232 (see FIGS. 8C and 9C). When tube 110 and emitter 220 are joined, first pressure reducing groove 232 and the inner wall surface of tube 110 form first pressure reducing channel 242. The irrigation liquid taken from intake part 250 is guided to second connecting groove 233 (second connecting channel 243) while the pressure thereof is reduced by first pressure reducing channel 242.

Second connecting groove 233 (second connecting channel 243) connects first pressure reducing groove 232 (first pressure reducing channel 242), second pressure reducing groove 234 (second pressure reducing channel 244) and third pressure reducing groove 235 (third pressure reducing channel 245). Second connecting groove 233 is formed in a linear shape along the minor axial direction of emitter 220 at the outer edge of rear surface 224. When tube 110 and emitter 220 are joined, second connecting groove 233 and the inner wall surface of tube 110 form second connecting channel 243. The irrigation liquid which has been taken from intake part 250 and guided to first connecting channel 241 while the pressure thereof is reduced by first pressure reducing channel 242 is guided to second pressure reducing channel 244 and third pressure reducing channel 245 through second connecting channel 243.

Second pressure reducing groove 234 (second pressure reducing channel 244) is disposed on the upstream side of flow rate reducing part 260 in the first channel, and connects second connecting groove 233 (second connecting channel 243) and flow rate reducing part 260. Second pressure reducing groove 234 (second pressure reducing channel 244) guides, to flow rate reducing part 260, the irrigation liquid coming from second connecting groove 233 (second connecting channel 243) while reducing the pressure of the liquid. Second pressure reducing groove 234 is disposed along the longitudinal axial direction of emitter 220 at the outer edge of rear surface 224. The upstream end of second pressure reducing groove 234 is connected with the downstream end of second connecting groove 233, and the downstream end of second pressure reducing groove 234 is connected with first connecting through hole 265 communicated with flow rate reducing part 260. The shape of second pressure reducing groove 234 is not limited as long as the above-described function can be ensured. In the present embodiment, in plan view, second pressure reducing groove 234 has a zigzag shape as with the shape of first pressure reducing groove 232. In second pressure reducing groove 234, fourth protrusions 237, each of which protrudes from the inner surface of second pressure reducing groove 234 and has a substantially triangular prism shape, are alternately disposed along the flow direction of the irrigation liquid. Fourth protrusion 237 includes first protrusion 1361 disposed on the bottom side of second pressure reducing groove 234, and second protrusion 1362 disposed on the opening (rear surface 224) side of second pressure reducing groove 234 (see FIGS. 8C and 9C). When tube 110 and emitter 220 are joined, second pressure reducing groove 234 and the inner wall surface of tube 110 form second pressure reducing channel 244. In the present embodiment, second pressure reducing groove 234 (second pressure reducing channel 244) is longer than third pressure reducing groove 235 (third pressure reducing channel 245) described later. Accordingly, the pressure of the irrigation liquid flowing through second pressure reducing groove 234 (second pressure reducing channel 244) is reduced more than the irrigation liquid flowing through third pressure reducing groove 235 (third pressure reducing channel 245). A part of the irrigation liquid which has been taken from intake part 250 while the pressure thereof being reduced is guided to flow rate reducing part 260 while the pressure thereof is reduced by second pressure reducing channel 244.

Third pressure reducing groove 235 (third pressure reducing channel 245) is disposed on the upstream side of flow rate reducing part 260 in the second channel, and connects second connecting groove 233 (second connecting channel 243) and channel opening-closing part 270. Third pressure reducing groove 235 (third pressure reducing channel 245) guides, to channel opening-closing part 270, the irrigation liquid coming from second connecting groove 233 (second connecting channel 243) while reducing the pressure of the liquid. Third pressure reducing groove 235 is disposed along the longitudinal axial direction of emitter 220 at a center portion of rear surface 224. The upstream end of third pressure reducing groove 235 is connected with the downstream end of second connecting channel 243, and the downstream end of third pressure reducing groove 235 is connected with third connecting through hole 274 communicated with channel opening-closing part 270. The shape of third pressure reducing groove 235 is not limited as long as the above-described function can be ensured. In the present embodiment, in plan view, third pressure reducing groove 235 has a zigzag shape as with the shape of first pressure reducing groove 232. In third pressure reducing groove 235, fifth protrusions 238, each of which protrudes from the inner surface of third pressure reducing groove 235 and has a substantially triangular prism shape, are alternately disposed along the flow direction of the irrigation liquid. As illustrated in FIGS. 8C and 9C, fifth protrusion 238 includes first protrusion 1361 disposed on the bottom side of third pressure reducing groove 235, and second protrusion 1362 disposed on the opening (rear surface 224) side of third pressure reducing groove 235. When tube 110 and emitter 220 are joined, third pressure reducing groove 235 and the inner wall surface of tube 110 form third pressure reducing channel 245. Another part of the irrigation liquid which has taken from intake part 250 while the pressure thereof is reduced by first pressure reducing channel 242 is guided to channel opening-closing part 270 while the pressure thereof is reduced by third pressure reducing channel 245. As elaborated later, the second channel operates only when the pressure of the irrigation liquid is low.

Flow rate reducing part 260 is disposed between second pressure reducing channel 244 (second pressure reducing groove 234) and discharging part 280 in the first channel on front surface 225 side of emitter 220. Flow rate reducing part 260 sends the irrigation liquid to discharging part 280 while reducing the flow rate of the irrigation liquid in accordance with the pressure of the irrigation liquid in tube 110. The configuration of flow rate reducing part 260 is not limited as long as the above-described function can be ensured. In the present embodiment, flow rate reducing part 260 includes flow rate reducing recess 261, first valve seat part 262, communication groove 263, flow rate reducing through hole 264 communicated with discharging part 280, first connecting through hole 265 communicated with second pressure reducing groove 234 (second pressure reducing channel 244), second connecting through hole 266 communicated with channel opening-closing through hole 273 of channel opening-closing part 270, and first diaphragm part 267 that is a part of film 222. At the inner surface of flow rate reducing recess 261, flow rate reducing through hole 264 communicated with discharging part 280, first connecting through hole 265 communicated with second pressure reducing groove 234 (second pressure reducing channel 244), and second connecting through hole 266 communicated with channel opening-closing through hole 273 of channel opening-closing part 270 open.

In plan view, flow rate reducing recess 261 has a substantially circular shape. In the bottom surface of flow rate reducing recess 261, flow rate reducing through hole 264 communicated with discharging part 280, first connecting through hole 265 communicated with second pressure reducing groove 234 (second pressure reducing channel 144), and second connecting through hole 266 communicated with channel opening-closing part 270, and first valve seat part 262 are disposed. The depth of flow rate reducing recess 261 is not limited as long as the depth of flow rate reducing recess 261 is equal to or greater than the depth of communication groove 263.

Flow rate reducing through hole 264 is disposed at a center portion of the bottom surface of flow rate reducing recess 261, and is communicated with discharging part 280. First valve seat part 262 is disposed on the bottom surface of flow rate reducing recess 261 to surround flow rate reducing through hole 264. First valve seat part 262 is formed such that first valve seat part 262 can make intimate contact with first diaphragm part 267 when the pressure of the irrigation liquid flowing through tube 110 is the second pressure or greater. When first diaphragm part 267 makes contact with first valve seat part 262, the flow rate of the irrigation liquid flowing from flow rate reducing recess 261 into discharging part 280 is reduced. The shape of first valve seat part 262 is not limited as long as the above-described function can be ensured. In the present embodiment, first valve seat part 262 has a shape of an annular protrusion. In the present embodiment, the height of the end surface of annular protrusion from the bottom surface of flow rate reducing recess 261 decreases from the inner side toward the outer side. Communication groove 263, which communicates between the inside of flow rate reducing recess 261 and flow rate reducing through hole 264, is formed in a part of the region of first valve seat part 262 where first diaphragm part 267 can make intimate contact with first valve seat part 262. First connecting through hole 265 communicated with second pressure reducing groove 234 (second pressure reducing channel 244) and second connecting through hole 266 communicated with channel opening-closing through hole 273 of channel opening-closing part 270 are formed in the region where first valve seat part 262 is not disposed in the bottom surface of flow rate reducing recess 261. It is to be noted that first connecting through hole 265 communicated with second pressure reducing groove 234 (second pressure reducing channel 244) may be disposed so as to be surrounded by first valve seat part 262, and flow rate reducing through hole 264 communicated with discharging part 280 may be disposed outside first valve seat part 262.

First diaphragm part 267 is a part of film 222. First diaphragm part 267 is disposed in such a manner as to close the communication between the inside of flow rate reducing recess 261 and the inside of tube 110. First diaphragm part 267 has flexibility, and deforms in such a manner as to make contact with first valve seat part 262 in accordance with the pressure of the irrigation liquid in tube 110. To be more specific, first diaphragm part 267 deforms toward first valve seat part 262 as the pressure of the irrigation liquid increases, and finally makes contact with first valve seat part 262. Even when first diaphragm part 267 is in intimate contact with first valve seat part 262, neither of first connecting through hole 265, flow rate reducing through hole 264 nor communication groove 263 is closed by first diaphragm part 267, and therefore the irrigation liquid sent from first connecting through hole 265 can be sent to discharging part 280 through communication groove 263 and flow rate reducing through hole 264. It is to be noted that first diaphragm part 267 is disposed next to second diaphragm part 275 described later.

Channel opening-closing part 270 is disposed between third pressure reducing channel 245 (third pressure reducing groove 235) and discharging part 280 in the second channel on front surface 225 side of emitter 220. Channel opening-closing part 270 opens the second channel in accordance with the pressure in tube 110, and sends the irrigation liquid to discharging part 280. In the present embodiment, channel opening-closing part 270 is connected with flow rate reducing part 260 through channel opening-closing through hole 273 and second connecting through hole 266, and the irrigation liquid from third pressure reducing channel 245 (third pressure reducing groove 235) reaches discharging part 280 through channel opening-closing part 270 and flow rate reducing part 260. The configuration of channel opening-closing part 270 is not limited as long as the above-described function can be ensured. In the present embodiment, channel opening-closing part 270 includes channel opening-closing recess 271, second valve seat part 272, channel opening-closing through hole 273 communicated with second connecting through hole 266 of flow rate reducing part 260, third connecting through hole 274 communicated with third pressure reducing channel 245 (third pressure reducing groove 235), and second diaphragm part 275 that is a part of film 222. At the inner surface of channel opening-closing recess 271, third connecting through hole 274 communicated with third pressure reducing channel 245 (third pressure reducing groove 235), and channel opening-closing through hole 273 communicated with flow rate reducing part 260 open. In addition, channel opening-closing recess 271 is communicated with flow rate reducing recess 261 of flow rate reducing part 260.

In plan view, channel opening-closing recess 271 has a substantially circular shape. In the bottom surface of channel opening-closing recess 271, third connecting through hole 274 connected with third pressure reducing groove 235, channel opening-closing through hole 273 connected with flow rate reducing part 260, and second valve seat part 272 are disposed. The end surface of second valve seat part 272 is disposed on front surface 225 side relative to the end surface of first valve seat part 262. That is, second valve seat part 272 is higher than first valve seat part 262. With this configuration, when film 222 is deformed with the pressure of the irrigation liquid, film 222 first makes contact with second valve seat part 272 before making contact with first valve seat part 262.

Third connecting through hole 274 communicated with third pressure reducing groove 235 is disposed in the region where second valve seat part 272 is not disposed in the bottom surface of channel opening-closing recess 271. Second valve seat part 272 is disposed on the bottom surface of channel opening-closing recess 271 to surround channel opening-closing through hole 273. In addition, second valve seat part 272 is disposed to face second diaphragm part 275 without making contact with second diaphragm part 275, and is formed such that second diaphragm part 275 can make intimate contact with valve seat part 272 when the pressure of the irrigation liquid flowing through tube 110 is the first pressure or greater. When the pressure of the irrigation liquid flowing through tube 110 is the first pressure or greater, second diaphragm part 275 makes intimate contact with second valve seat part 272 to close channel opening-closing through hole 273, and as a result, the second channel is closed. The shape of second valve seat part 272 is not limited as long as the above-described function can be ensured. In the present embodiment, second valve seat part 272 is an annular protrusion disposed to surround channel opening-closing through hole 273.

Second diaphragm part 275 is a part of film 222, and is disposed next to first diaphragm part 267. Second diaphragm part 275 is disposed in such a manner as to close the communication between the inside of channel opening-closing recess 271 and the inside of tube 110. Second diaphragm part 275 has flexibility, and deforms in such a manner as to make contact with second valve seat part 272 in accordance with the pressure of the irrigation liquid in tube 110. To be more specific, second diaphragm part 275 deforms toward second valve seat part 272 as the pressure of the irrigation liquid increases, and, when the pressure of the irrigation liquid becomes the first pressure, makes contact with second valve seat part 272. In this manner, the second channel (channel opening-closing through hole 273) is closed.

Discharging part 280 is disposed to face discharging port 112 on rear surface 224 side of emitter 220. Discharging part 280 sends, to discharging port 112 of tube 110, the irrigation liquid coming from flow rate reducing through hole 264. With this configuration, discharging part 280 can discharge the irrigation liquid out of emitter 220. The configuration of discharging part 280 is not limited as long as the above-described function can be ensured. In the present embodiment, discharging part 280 includes discharging recess 281 and entry preventing part 282.

Discharging recess 281 is disposed on rear surface 224 side of emitter 220. In plan view, discharging recess 281 has a substantially rectangular shape. In the bottom surface of discharging recess 281, flow rate reducing through hole 264 and entry preventing part 282 are disposed.

Entry preventing part 282 prevents entry of foreign matters from discharging port 112. Entry preventing part 282 is not limited as long as the above-described function can be ensured. In the present embodiment, entry preventing part 282 includes two projection line parts 283 disposed next to each other. Two projection line parts 283 are disposed such that projection line parts 283 are located between flow rate reducing through hole 264 and discharging port 112 when emitter 220 is joined to tube 110.

Film 222 includes first diaphragm part 267 and second diaphragm part 275. Film 222 has a thickness of 0.3 mm, for example.

Hinge part 223 is connected with a part of front surface 225 of emitter main body 221. In the present embodiment, the thickness of hinge part 223 is identical to the thickness of film 222, and hinge part 223 is formed integrally with emitter main body 221 and film 222. It is to be noted that film 222 may be prepared as a separate member that is separated from emitter main body 221 and is joined to emitter main body 221.

Emitter 220 is configured when film 222 is joined to front surface 225 of emitter main body 221 by turning film 222 about hinge part 223. The method of joining emitter main body 221 and film 222 is not limited. Examples of the method of joining emitter main body 221 and film 222 include welding of the resin material of film 222, bonding with an adhesive agent, and the like. It is to be noted that hinge part 223 may be cut out after emitter main body 221 and film 222 are joined.

Operations of Drip Irrigation Tube and Emitter

Next, an operation of the drip irrigation tube according to the present embodiment is described. First, irrigation liquid is fed into tube 110. Examples of the irrigation liquid include water, liquid fertilizer, agricultural chemicals and mixtures thereof. Preferably, the pressure of the irrigation liquid that is fed to drip irrigation tube is 0.1 MPa or lower in order to simply implement the drip irrigation method, and to prevent tube 110 and emitter 220 from being damaged. The irrigation liquid in tube 110 is taken from intake part 250 into emitter 220. To be more specific, the irrigation liquid in tube 110 enters intake recess 253 from the gap between slits 254, or the gap between projection lines 255 and passes through intake through hole 252. At this time, the floating matters in the irrigation liquid can be removed since intake part 250 includes intake side screen part 251 (the gaps between slits 254 and projection lines 255). In addition, the pressure drop of the irrigation liquid having entered intake part 250 is suppressed since a so-called wedge wire structure is formed in intake part 250.

The irrigation liquid taken from intake part 250 reaches first connecting channel 241. The irrigation liquid having reached first connecting channel 241 reaches second connecting channel 243 while the pressure thereof is reduced by first pressure reducing channel 242. The irrigation liquid having reached second connecting channel 243 flows into second pressure reducing channel 244 and third pressure reducing channel 245, and the pressure thereof is reduced. At this time, the irrigation liquid first advances through third pressure reducing channel 245 that causes smaller pressure drop and has a shorter channel length in comparison with second pressure reducing channel 244. The irrigation liquid having entered third pressure reducing channel 245 flows into through channel opening-closing part 270 through third connecting hole 274. In emitter 220 according to the present embodiment, first protrusion 1361 and second protrusion 1362 are provided in each of third protrusion 236 disposed at the inner surface of first pressure reducing groove 232 (first pressure reducing channel 242), fourth protrusion 237 disposed at the inner surface of second pressure reducing groove 234 (second pressure reducing channel 244), and fifth protrusion 238 disposed at the inner surface of third pressure reducing groove 235 (third pressure reducing channel 245). With this configuration, also in emitter 220 according to the present embodiment, a three-dimensionally swirling vortex is generated in first pressure reducing channel 242, second pressure reducing channel 244 and third pressure reducing channel 245.

The irrigation liquid having entered channel opening-closing part 270 flows into flow rate reducing part 260 through channel opening-closing through hole 273 and second connecting through hole 266. Next, the irrigation liquid having entered flow rate reducing part 260 flows into discharging part 280 through flow rate reducing through hole 264. Finally, the irrigation liquid having entered discharging part 280 is discharged out of tube 110 from discharging port 112 of tube 110.

On the other hand, the irrigation liquid having entered second pressure reducing channel 244 flows into flow rate reducing part 260 through first connecting through hole 265. The irrigation liquid having entered flow rate reducing part 260 flows into discharging part 280 through flow rate reducing through hole 264. The irrigation liquid having entered discharging part 280 is discharged out of tube 110 from discharging port 112 of tube 110.

As described above, channel opening-closing part 270 and flow rate reducing part 260 are communicated with each other through channel opening-closing through hole 273 and second connecting through hole 266. In addition, in flow rate reducing part 260, first diaphragm part 267 deforms in accordance with the pressure of the irrigation liquid in tube 110, whereby the flow rate of the irrigation liquid is controlled. In channel opening-closing part 270, second diaphragm part 275 deforms in accordance with the pressure of the irrigation liquid in tube 110, whereby the flow rate of the irrigation liquid is controlled. In view of this, operations of flow rate reducing part 260 and channel opening-closing part 270 in accordance with the pressure of the irrigation liquid in tube 110 are described.

Figure 10A:
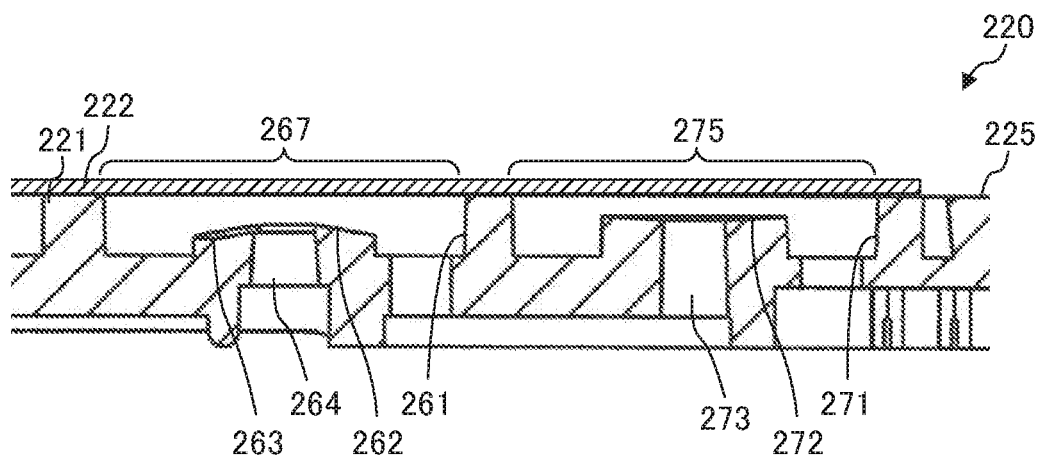
FIGS. 10A to 10C are schematic views for describing operations of the emitter according to Embodiment 2 of the present invention.
Figure 10B:
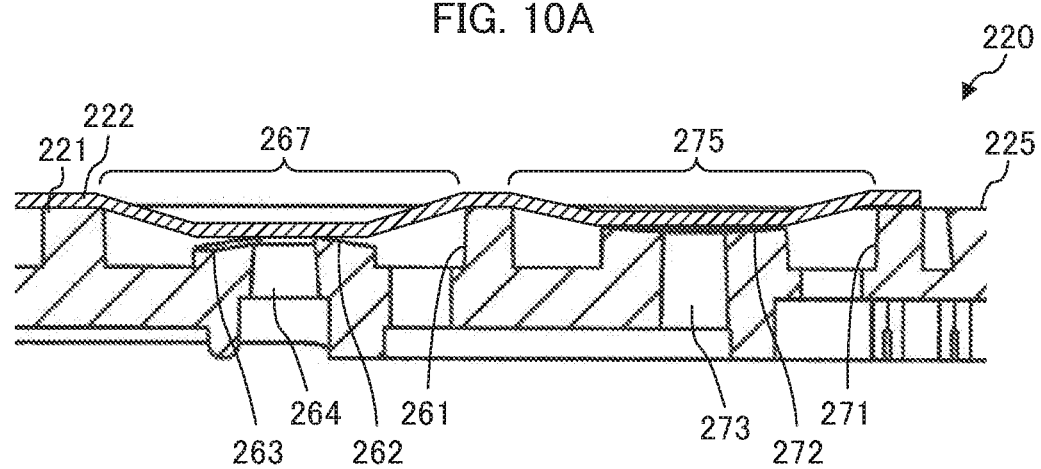
Figure 10C:
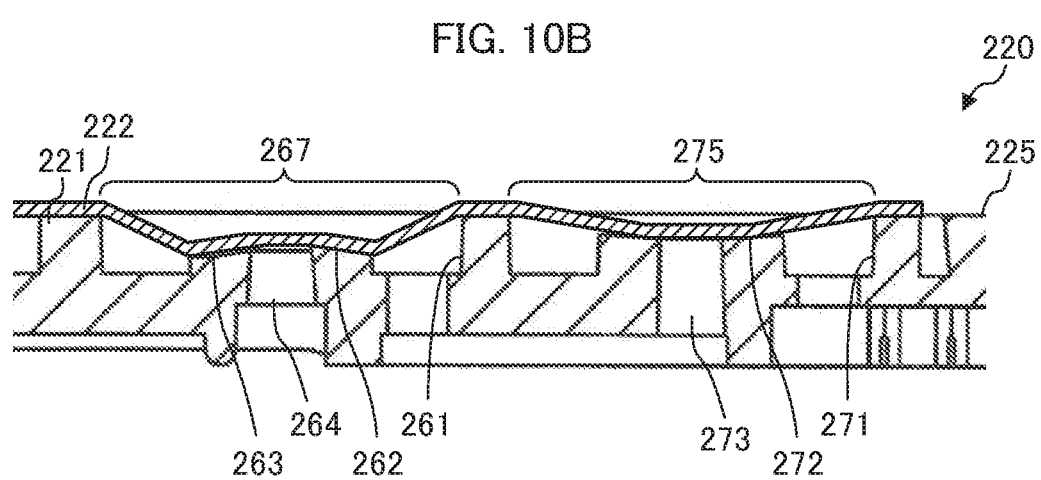

FIGS. 10A to 10C are schematic views illustrating an operational relationship between flow rate reducing part 260 and channel opening-closing part 270. It is to be noted that FIGS. 10A to 10C are schematic cross-sectional views along line B-B of FIG. 8A. FIG. 10A is a sectional view of a state where no irrigation liquid is fed to tube 110, FIG. 10B is a sectional view of a state where the pressure of the irrigation liquid in tube 110 is a first pressure, and FIG. 10C is a sectional view of a state where the pressure of the irrigation liquid in tube 110 is a second pressure greater than the first pressure.

In a state before the irrigation liquid is fed into tube 110, no pressure of the irrigation liquid is applied to film 222, and therefore neither first diaphragm part 267 nor second diaphragm part 275 deforms (see FIG. 10A).

When the feeding of the irrigation liquid into tube 110 is started, first diaphragm part 267 of flow rate reducing part 260 starts to deform toward first valve seat part 262. In addition, second diaphragm part 275 of channel opening-closing part 270 starts to deform toward second valve seat part 272. However, in this state, first diaphragm part 267 is not in intimate contact with first valve seat part 262, and second diaphragm part 275 is not in intimate contact with second valve seat part 272, and accordingly, the irrigation liquid taken from intake part 250 is discharged to the outside from discharging port 112 of tube 110 through both the first channel (first connecting channel 241, first pressure reducing channel 242, second connecting channel 243, second pressure reducing channel 244, flow rate reducing part 260 and discharging part 280) and the second channel (first connecting channel 241, first pressure reducing channel 242, second connecting channel 243, third pressure reducing channel 245, channel opening-closing part 270, flow rate reducing part 260 and discharging part 280). In this manner, at the start of feeding of the irrigation liquid to tube 110, and/or in the case where the pressure of the irrigation liquid in tube 110 is lower than a predetermined pressure, the irrigation liquid taken from intake part 250 is discharged through both the first channel and the second channel.

Next, when the pressure of the irrigation liquid in tube 110 increases, first diaphragm part 267 and second diaphragm part 275 further deforms. Then, second diaphragm part 275 makes contact with second valve seat part 272 and closes the second channel (see FIG. 10B). At this time, since the end surface of second valve seat part 272 is disposed on the front surface 225 side relative to the end surface of first valve seat part 262, second diaphragm part 275 makes contact with second valve seat part 272 before first diaphragm part 267 makes contact with first valve seat part 262. At this time, first diaphragm part 267 is not in contact with first valve seat part 262. In this manner, when the pressure of the irrigation liquid in tube 110 is so increased as to deform film 222, second diaphragm part 275 comes closer to second valve seat part 272, and accordingly the amount of the irrigation liquid that is discharged through the second channel decreases. Then, when the pressure of the irrigation liquid in tube 110 becomes the first pressure, the irrigation liquid in the second channel is not discharged from discharging port 112. As a result, the irrigation liquid taken from intake part 250 is discharged to the outside from discharging port 112 of tube 110 through only the first channel.

When the pressure of the irrigation liquid in tube 110 further increases, first diaphragm part 267 further deforms toward first valve seat part 262. Normally, the amount of the irrigation liquid that flows through the first channel increases as the pressure of the irrigation liquid increases; however, in emitter 220 according to the present embodiment, excessive increase in the amount of the liquid that flows through the first channel irrigation is prevented by reducing the distance between first diaphragm part 267 and first valve seat part 262 while the pressure of the irrigation liquid is reduced by first pressure reducing channel 242 and second pressure reducing channel 244. When the pressure of the irrigation liquid in tube 110 is equal to or greater than the second pressure, which is greater than the first pressure, first diaphragm part 267 makes contact with first valve seat part 262 (see FIG. 10C). Even in this case, neither of first connecting through hole 265, flow rate reducing through hole 264 nor communication groove 263 is closed by first diaphragm part 267, and accordingly the irrigation liquid taken from intake part 250 is discharged to the outside from discharging port 112 of tube 110 through communication groove 263. In this manner, in flow rate reducing part 260, when the pressure of the irrigation liquid in tube 110 is equal to or greater than the second pressure, first diaphragm part 267 makes contact with first valve seat part 262, and thus increase of the amount of the irrigation liquid that flows through the first channel is suppressed.

As described above, flow rate reducing part 260 and channel opening-closing part 270 operate such that the amounts of the liquid flowing therethrough are offset each other in accordance with the pressure of the irrigation liquid in tube 110, and thus the drip irrigation tube according to the present embodiment can discharge a constant amount of irrigation liquid out of tube 110 regardless whether the pressure of the irrigation liquid is high or low.

Effect

As described above, in emitter 220 according to the present embodiment, each of third protrusion 236, fourth protrusion 237 and fifth protrusion 238 is provided with first protrusion 1361 whose tip end crosses the center line of first pressure reducing groove 232, second pressure reducing groove 234 or third pressure reducing groove 235, and second protrusion 1362 whose tip end does not cross the center line of first pressure reducing groove 232, second pressure reducing groove 234 or third pressure reducing groove 235. With this configuration, a vortex of irrigation liquid that moves also in the depth direction of first pressure reducing groove 232, second pressure reducing groove 234 and third pressure reducing groove 235 can be generated. As a result, in comparison with the case where no first protrusion 1361 is provided and the case where only first protrusion 1361 is provided, emitter 220 according to the present embodiment can further enhance the effect of agitating the irrigation liquid in first pressure reducing channel 242. Accordingly, emitter 220 according to the present embodiment can quantitatively drop the irrigation liquid while suppressing the clogging in first pressure reducing channel 242, second pressure reducing channel 244 and third pressure reducing channel 245.

Further, the drip irrigation tube according to Embodiment 2 includes channel opening-closing part 270 that mainly operates in the low pressure state, and flow rate reducing part 260 that mainly operates in the high pressure state. Thus the drip irrigation tube according to Embodiment 2 can quantitatively drop the irrigation liquid regardless of the pressure of the irrigation liquid in tube 110.

In Embodiments 1 and 2, first protrusion 1361 is disposed on the bottom side, and second protrusion 1362 is disposed the opening (rear surfaces 124 and 224) side in the depth direction of pressure reducing groove 132, first pressure reducing groove 232, second pressure reducing groove 234 and third pressure reducing groove 235. However, the placement of first protrusion 1361 and second protrusion 1362 is not limited to this, while it is preferable that first protrusion 1361 and second protrusion 1362 be placed as in the Embodiments 1 and 2 from a view point of the ease of shaping (releasing) of emitters 120 and 220. That is, first protrusion 1361 may be disposed on the opening (rear surface 124, 224) side and second protrusion 1362 may be disposed on the bottom side in the depth direction of the pressure reducing groove.

In addition, while first connecting channel 241, first pressure reducing channel 242, second connecting channel 243, second pressure reducing channel 244 and third pressure reducing channel 245 are formed when emitter 220 and tube 110 are joined in Embodiment 2, first connecting channel 241, first pressure reducing channel 242, second connecting channel 243, second pressure reducing channel 244 and third pressure reducing channel 245 may be formed in advance as channels in emitter 220.

In addition, while the contact timing of deformed film 222 is adjusted by the difference in heights of first valve seat part 262 and second valve seat part 272 in Embodiment 2, the heights of first valve seat part 262 and second valve seat part 272 may be equal to each other. In this case, the contact timing of deformed film 222 may be adjusted by setting different thicknesses and/or using different materials (materials having different elasticities) between first diaphragm part 267 and second diaphragm part 275.

In addition, the emitter and the drip irrigation tube of the present invention is not limited to emitters 120 and 220 or drip irrigation tube 100 according to Embodiments 1 and 2. The configuration of the pressure reducing channel of the emitter according to the present invention is applicable to emitters that have a pressure reducing channel of a zigzag shape. For example, the configuration of the pressure reducing channel of the emitter according to the present invention is applicable to the emitter disclosed in U.S. Pat. No. 4,718,608 and the emitter disclosed in U.S. Pat. No. 5,829,685.

This application is entitled to and claims the benefit of Japanese Patent Application No. 2015-195668 filed on Oct. 1, 2015, the disclosure each of which including the specification, drawings and abstract is incorporated herein by reference in its entirety.

INDUSTRIAL APPLICABILITY

According to the present invention, it is possible to easily provide an emitter which can drop liquid with an appropriate rate without causing clogging. Accordingly, popularization of the emitter in the technical fields of drip irrigations and endurance tests where long-term dropping is required, and development in the technical fields can be expected.

REFERENCE SIGNS LIST

1 Emitter
2 Channel
3 Inlet
4 Outlet
5 Control path
6 Protrusion
a Channel width
100 Drip irrigation tube
110 Tube
112 Discharging port
120, 220 Emitter
221 Emitter main body
222 Film
223 Hinge part
124, 224 Rear surface 125, 225 Front surface
131, 231 (First) Connecting groove
132, 232 (First) Pressure reducing groove
233 Second connecting groove
234 Second pressure reducing groove
235 Third pressure reducing groove
136, 136', 236 (Third) Protrusion
1361 First protrusion
1362 Second protrusion
237 Fourth protrusion
238 Fifth protrusion
141, 241 (First) Connecting channel
142, 142', 242 (First) Pressure reducing channel
243 Second connecting channel
244 Second pressure reducing channel
245 Third pressure reducing channel
150, 250 Intake part
151, 251 Intake side screen part
152, 252 Intake through hole
153, 253 Intake recess
254 Slit
155, 255 Projection line
260 flow rate reducing part
261 Flow rate reducing recess
262 First valve seat part
263 Communication groove
264 Flow rate reducing through hole
265 First connecting through hole
266 Second connecting through hole
267 First diaphragm part
270 Channel opening-closing part
271 Channel opening-closing recess
272 Second valve seat part
273 Channel opening-closing through hole
274 Third connecting through hole
275 Second diaphragm part
180, 280 Discharging part
181, 281 Discharging recess
282 Entry preventing part
283 Projection line part
L Center line

The invention claimed is:

1. An emitter configured to be joined on an inner wall surface of a tube for carrying irrigation liquid at a position corresponding to a discharging port that communicates between inside and outside of the tube, the emitter being configured to quantitatively discharge the irrigation liquid in the tube from the discharging port to the outside of the tube, the emitter comprising:

an intake part for intake of the irrigation liquid;

a discharging part configured to be disposed to face the discharging port, and confured to discharge the irrigation liquid;

a channel configured to connect the intake part and the discharging part, and configured to distribute the irrigation liquid; and a pressure reducing channel disposed in the channel, and configured to reduce a pressure of the irrigation liquid taken from the intake part, wherein the pressure reducing channel includes:

a groove including an opening configured to be closed by the inner wall surface of the tube, and a plurality of protrusions protruding from both sides of an inner surface of the groove, the plurality of protrusions being alternately arranged in a flow direction of the irrigation liquid in the pressure reducing channel, wherein each of the plurality of protrusions includes a first protrusion and a second protrusion that are arranged next to each other in a depth direction of the groove, wherein the first protrusion is disposed on one side in each of the plurality of protrusions in the depth direction of the groove, wherein the first protrusion protrudes from the inner surface of the groove such that a tip end of the first protrusion crosses a center line of the groove in plan view, wherein the second protrusion is disposed on another side in each of the plurality of protrusions in the depth direction of the groove, wherein the second protrusion protrudes from the inner surface of the groove such that a tip end of the second protrusion does not cross the center line of the groove in plan view, and wherein the second protrusion is configured to contact the inner surface of the tube.

2. The emitter according to claim 1, wherein the first protrusion is disposed on a bottom side of the groove in the each of the plurality of protrusions; and wherein the second protrusion is disposed on an opening side of the groove in the each of the plurality of protrusions.

3. A drip irrigation tube comprising:

the tube including the discharging port for discharging irrigation liquid; and the emitter according to claim 1 that is joined on the inner wall surface of the tube at the position corresponding to the discharging port.

4. A drip irrigation tube comprising:

the tube including the discharging port for discharging irrigation liquid; and the emitter according to claim 2 that is joined on the inner wall surface of the tube at the position corresponding to the discharging port.

* * * * *